United States Patent
Mattice et al.

(10) Patent No.: US 9,710,103 B2
(45) Date of Patent: *Jul. 18, 2017

(54) METHOD AND APPARATUS FOR DETECTING LIFT OFF OF A TOUCHSCREEN

(71) Applicant: IGT, Las Vegas, NV (US)

(72) Inventors: Harold E. Mattice, Gardnerville, NV (US); Chauncey W. Griswold, Reno, NV (US); Christian E. Gadda, Las Vegas, NV (US); Richard L. Wilder, Sparks, NV (US); James W. Stockdale, Clio, CA (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/147,467

(22) Filed: May 5, 2016

(65) Prior Publication Data

US 2016/0246444 A1    Aug. 25, 2016

Related U.S. Application Data

(63) Continuation of application No. 12/372,595, filed on Feb. 17, 2009, now Pat. No. 9,335,869, which is a (Continued)

(51) Int. Cl.
*G06F 3/041* (2006.01)
*G06F 3/043* (2006.01)
(Continued)

(52) U.S. Cl.
CPC ............ *G06F 3/0416* (2013.01); *G06F 3/043* (2013.01); *G06F 3/044* (2013.01); *G06F 3/0488* (2013.01); *G06F 3/04883* (2013.01); *G06F 3/04886* (2013.01); *G07F 17/3209* (2013.01); *G07F 17/3239* (2013.01); *A63F 2300/1075* (2013.01);
(Continued)

(58) Field of Classification Search
CPC ........ G06F 2203/04808; G06F 3/0416; G06F 3/043; G06F 3/044; G06F 3/0488; G06F 3/04883; G06F 3/04886; G07F 17/3209; G07F 17/3239
See application file for complete search history.

(56) References Cited

U.S. PATENT DOCUMENTS 5,854,450 A    12/1998  Kent
5,880,411 A    3/1999   Gillespie et al.
(Continued)

OTHER PUBLICATIONS

Buxton, "Multi-Touch systems that I have Known and Loved," Feb. 9, 2007, from http://www.billbuxton.com/multitouchOverview.htm, 16 pages.
(Continued)

*Primary Examiner* — Afroza Chowdhury
(74) *Attorney, Agent, or Firm* — Neal, Gerber & Eisenberg LLP (57) ABSTRACT

A composite touchscreen incorporates acoustic pulse recognition sensing and capacitive sensing technology. The hybrid screen incorporates the advantages of each technology while minimizing the drawbacks. When such a screen is incorporated in a gaming device specialized gestures and functions can be implemented that enhance the interface, the range of games, and the gaming experience.

22 Claims, 7 Drawing Sheets

Related U.S. Application Data continuation-in-part of application No. 11/865,581, filed on Oct. 1, 2007, now Pat. No. 8,125,459.

(51) Int. Cl.
*G06F 3/044* (2006.01)
*G06F 3/0488* (2013.01)
*G07F 17/32* (2006.01)

(52) U.S. Cl.
CPC .............. *G06F 2203/04106* (2013.01); *G06F 2203/04808* (2013.01)

(56) References Cited

U.S. PATENT DOCUMENTS

| | | | |
|---|---|---|---|
| 5,986,224 A | 11/1999 | Kent | |
| 6,028,271 A | 2/2000 | Gillespie et al. | |
| 6,323,846 B1 | 11/2001 | Westerman et al. | |
| 6,380,931 B1 | 4/2002 | Gillespie et al. | |
| 6,414,671 B1 | 7/2002 | Gillespie et al. | |
| 6,610,936 B2 | 8/2003 | Gillespie et al. | |
| 6,685,567 B2 | 2/2004 | Cockerille et al. | |
| 6,723,929 B2 | 4/2004 | Kent | |
| 6,750,852 B2 | 6/2004 | Gillespie et al. | |
| 6,888,536 B2 | 5/2005 | Westerman et al. | |
| 7,061,475 B2 | 6/2006 | Kent | |
| 7,109,978 B2 | 9/2006 | Gillespie et al. | |
| 7,254,775 B2 | 8/2007 | Geaghan et al. | |
| RE40,153 E | 3/2008 | Westerman et al. | |
| 7,339,580 B2 | 3/2008 | Westerman et al. | |
| 7,450,113 B2 | 11/2008 | Gillespie et al. | |
| 7,532,205 B2 | 5/2009 | Gillespie et al. | |
| 7,619,618 B2 | 11/2009 | Westerman et al. | |
| 7,656,394 B2 | 2/2010 | Westerman et al. | |
| 7,753,790 B2 | 7/2010 | Nguyen et al. | |
| 7,764,274 B2 | 7/2010 | Westerman et al. | |
| 7,782,307 B2 | 8/2010 | Westerman et al. | |
| 7,812,828 B2 | 10/2010 | Westerman et al. | |
| 7,812,829 B2 | 10/2010 | Gillespie et al. | |
| 7,911,456 B2 | 3/2011 | Gillespie et al. | |
| 7,914,378 B2 | 3/2011 | Mattice et al. | |
| 8,062,115 B2 | 11/2011 | Thomas et al. | |
| 2002/0185981 A1 | 12/2002 | Dietz et al. | |
| 2005/0037834 A1 | 2/2005 | Stern et al. | |
| 2005/0113163 A1 | 5/2005 | Mattice et al. | |
| 2005/0146512 A1* | 7/2005 | Hill | G06F 3/0436 345/173 |
| 2005/0221882 A1 | 10/2005 | Nguyen et al. | |
| 2006/0125804 A1 | 6/2006 | Kent | |
| 2006/0197750 A1 | 9/2006 | Kerr et al. | |
| 2006/0197752 A1 | 9/2006 | Hurst et al. | |
| 2006/0279548 A1* | 12/2006 | Geaghan | G06F 3/0416 345/173 |
| 2008/0055269 A1 | 3/2008 | LeMay et al. | |
| 2008/0266266 A1* | 10/2008 | Kent | G06F 3/0436 345/173 |
| 2008/0309626 A1 | 12/2008 | Westerman et al. | |
| 2008/0309630 A1 | 12/2008 | Westerman | |
| 2008/0309632 A1 | 12/2008 | Westerman et al. | |
| 2008/0316184 A1 | 12/2008 | D'Souza | |
| 2009/0054134 A1 | 2/2009 | Jackson | |
| 2009/0058829 A1 | 3/2009 | Kim et al. | |
| 2009/0084612 A1 | 4/2009 | Mattice et al. | |
| 2009/0191946 A1 | 7/2009 | Thomas et al. | |
| 2010/0160016 A1 | 6/2010 | Shimabukuro et al. | |

OTHER PUBLICATIONS

Tyco Electronics, "Acoustic Pulse Recognition: Breakthrough New Touch Technology for ELo TouchSystems," from media.elotouch.com/podfs/marcon/apr_wp.pdf -, Tyco Electronics Corporation, 2006, 12 pages.

* cited by examiner

METHOD AND APPARATUS FOR DETECTING LIFT OFF OF A TOUCHSCREEN

PRIORITY CLAIM

This application is a continuation of, claims priority to and the benefit of U.S. patent application Ser. No. 12/372,595, filed on Feb. 17, 2009, which is a continuation-in-part, claims priority to and the benefit of U.S. patent application Ser. No. 11/865,581, filed on Oct. 1, 2007, and issued as U.S. Pat. No. 8,125,459, the entire contents of which are incorporated by reference herein.

BACKGROUND OF THE INVENTION

Numerous devices incorporate touchscreens as both a display and an input device. Touchscreens are widely used in environments and form factors where a simple and dynamic interface is preferred.

Although touchscreens are widely used in gaming devices, for example, currently available touchscreens have limitations in detecting the increasing variety of inputs that the graphic user interfaces and applications make possible.

SUMMARY OF THE INVENTION

A composite touchscreen incorporates acoustic pulse recognition sensing and capacitive sensing technology. The hybrid screen incorporates the advantages of each technology while minimizing the drawbacks. When such a screen is incorporated in a gaming device specialized gestures and functions can be implemented that enhance the interface, the range of games, and the gaming experience.

One embodiment relates to a gaming system. The gaming system comprises a memory device, a microprocessor, and a composite touchscreen. The composite touchscreen comprises a display, an acoustic pulse recognition touchscreen subsystem, a capacitive touchscreen subsystem, and one or more touchscreen controllers. The touchscreen is configured to detect an x-y coordinate location of a touch upon the touchscreen with the acoustic pulse recognition subsystem and to detect a lift-off of an object with the capacitive touchscreen subsystem.

According to a further aspect of the embodiment, the gaming system is configured to access a database of touchscreen input data stored in the memory device of the system, and map a plurality of detected inputs at the composite touchscreen to one or more gestures, a first of the plurality of inputs comprising a lift-off of an object detected with the capacitive touchscreen subsystem and a second of the plurality of inputs comprising a touch of the composite touchscreen detected with the acoustic pulse recognition touchscreen subsystem.

Another embodiment relates to a gaming device, comprising a microprocessor, a memory device, and a touchscreen. The touchscreen comprises a transparent substrate, a plurality of acoustic pulse sensors disposed upon a first surface of the transparent substrate and configured to detect an acoustic wave generated by an object making contact with the substrate or a layer in contact with the substrate. The touchscreen further comprises a capacitive plate comprising a transparent conductive layer disposed upon a second surface of the transparent substrate, an insulating layer disposed upon a surface of the capacitive plate, and control circuitry configured to detect an x-y coordinate location of a touch by measuring an output of each of the plurality of acoustic pulse sensors, and to detect a lift-off of an object in contact with the capacitive plate or a layer disposed upon the plate.

Yet another embodiment relates to a method of operating a gaming machine. The method comprises establishing a first logical region of a touchscreen display, establishing a second logical region of a touchscreen display, detecting a touch within the first logical region with an acoustic pulse recognition portion of a touchscreen display, detecting a lift off of an object within the second logical region with a capacitive portion of the touchscreen display, and causing a change in the display within the first logical region when the lift off is detected in the second logical region.

A further understanding of the nature and advantages of the present invention may be realized by reference to the remaining portions of the specification and the drawings.

DETAILED DESCRIPTION OF THE PREFERRED EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Figure 1:
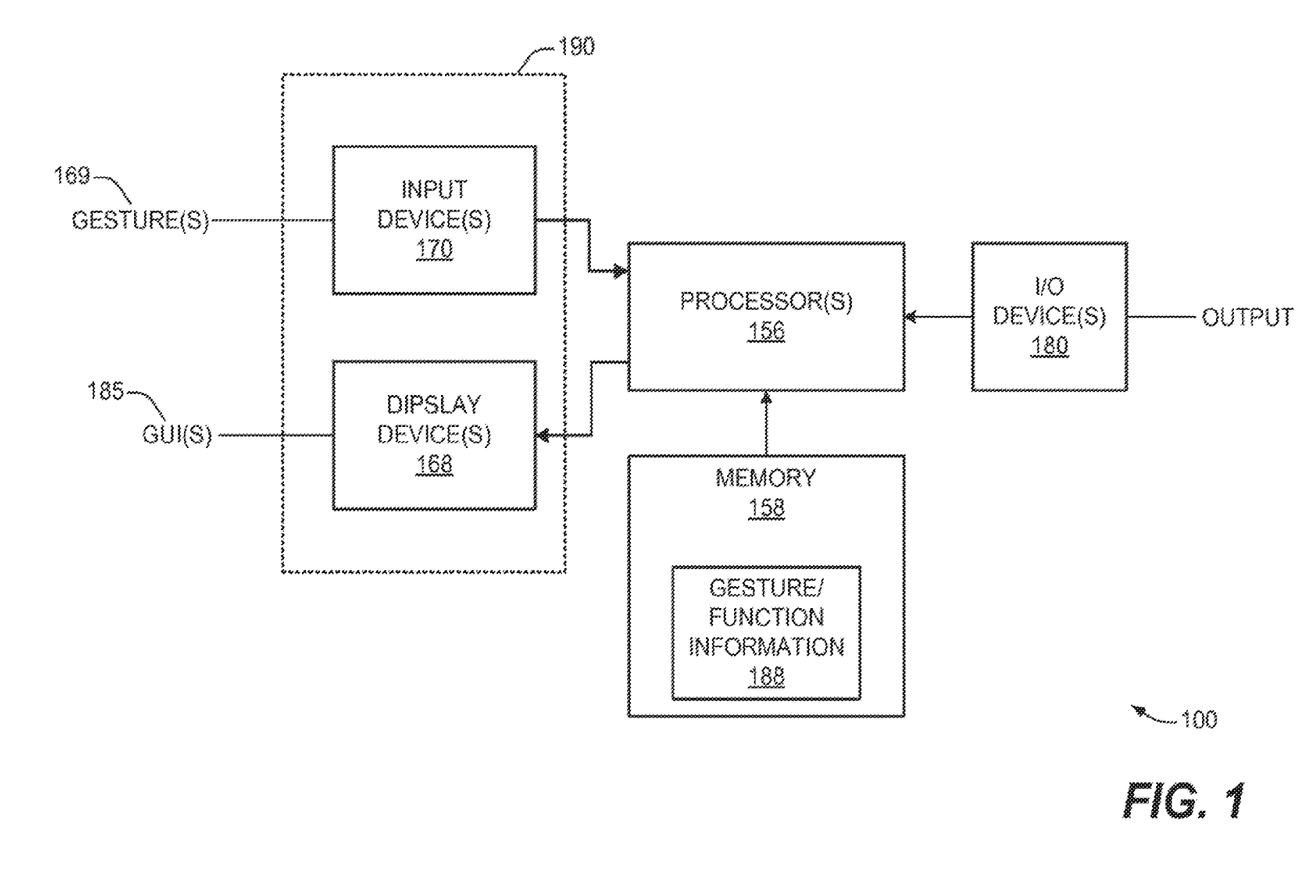
FIG. 1 is a block diagram of some components of gaming system 100, according to an embodiment of the invention.

FIG. 1 shows a block diagram of an example embodiment of a portion of an electronic gaming system 100.

As illustrated in the example embodiment of FIG. 1 electronic gaming system 100 may include at least one processor 156 configured to execute instructions and to carry out operations associated with the gaming system 100. For example, using instructions retrieved from memory, the processor(s) 156 may control the reception and manipulation of input and output data between components of the computing system 100. The processor(s) 156 may be implemented on a single-chip, multiple chips or multiple electrical components.

In at least one embodiment, the processor(s) 156 together with an operating system operates to execute code (such as, for example, game code) and produce and use data. A least a portion of the operating system, code and/or data may reside within a memory storage device 158 that may be operatively coupled to the processor(s) 156. Memory storage device 158 may be configured or designed to store code, data, and/or other types of information that may be used by the electronic gaming system 100. Memory storage device 158 is preferably a non-volatile mass storage device such as magnetic hard drive, Flash memory, NVRAM EEPROM, or other media.

The gaming system 100 may also include at least one display device 168 that may be operatively coupled to the processor(s) 156. In at least one embodiment, one or more display device(s) may include at least one flat display screen incorporating flat-panel display technology. This may include, for example, a liquid crystal display (LCD), a transparent light emitting diode (LED) display, an electroluminescent display (ELD), and a microelectromechanical device (MEM) display, such as a digital micromirror device (DMD) display or a grating light valve (GLV) display, etc. In some embodiments, one or more of the display screens may utilize organic display technologies such as, for example, an organic electroluminescent (OEL) display, an organic light emitting diode (OLED) display, a transparent organic light emitting diode (TOLED) display, a light emitting polymer display, etc. Any of these underlying display technologies may be incorporated into a touchscreen.

One or more of the display device(s) 168 may be generally configured to display a graphical user interface (GUI) 169 that provides an easy to use interface between a user of the gaming system and the operating system (and/or application(s) running thereon).

According to various embodiments, the GUI 169 may represent programs, interface(s), files and/or operational options with graphical images, objects, and/or vector representations. The graphical images may include windows, fields, dialog boxes, menus, icons, buttons, cursors, scroll bars, etc. Such images may be arranged in predefined layouts, and/or may be created dynamically to serve the specific actions of one or more users interacting with the display(s).

During operation, a user may select and/or activate various graphical images in order to initiate functions and/or tasks associated therewith. The GUI 169 may additionally and/or alternatively display information, such as non interactive text and/or graphics.

The gaming system 100 may also include one or more input device(s) 170 that may be operatively coupled to the processor(s) 156. The input device(s) 170 may for example be used to perform tracking and/or to make selections with respect to the GUI(s) 169 on one or more of the display(s) 168. The input device(s) 170 may also be used to issue commands at the electronic gaming system 2100.

Figure 2:
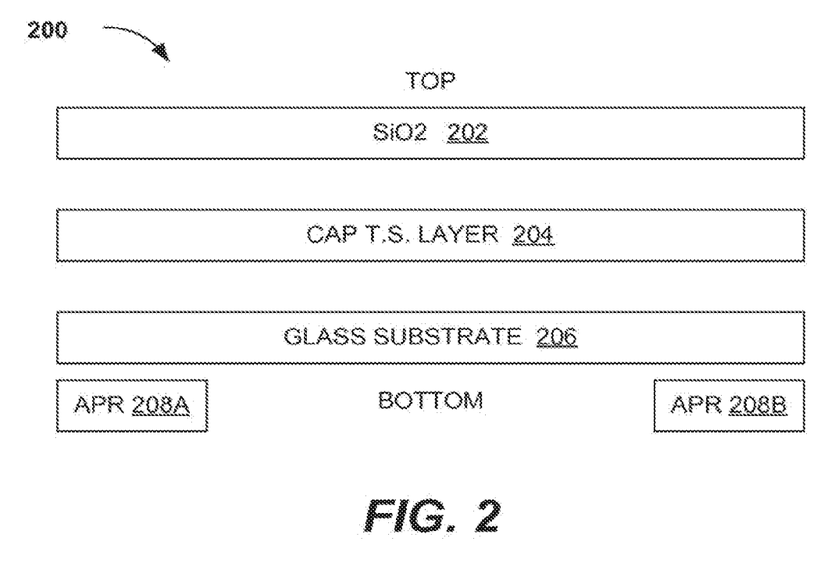
FIG. 2 is a side view or cross section of some components of composite touchscreen 200.

FIG. 2 illustrates a cross section of a composite touchscreen 200 in accordance with an embodiment of the invention. The composite touchscreen 200 comprises an acoustic pulse recognition ("APR") system 207 which comprises APR transducers 208A, 208B, 208C, and 208D (208C and D not shown in the cross section) etc. At least four transducers 208A-D are preferably present to detect the placement of a touch with sufficient precision, as will be discussed in greater detail below and with regard to FIGS. 3-4.

The top layer is provided as a silicon dioxide (SiO2) layer 202 which can serve as an insulating layer and a protection layer for the capacitive touchscreen layer/element 204. The capacitive touchscreen layer/element may be either of a surface capacitive technology or a projected capacitive technology. In an embodiment where the touchscreen element 204 is of a surface capacitive nature, it comprises a uniform conductive coating on a glass panel. Electrodes around the panel's edge evenly distribute a low voltage across the conductive layer, creating a uniform electric field. A touch draws current from each corner. The controller measures the ratio of the current flow from the corners and calculates the touch location. Inversely, the lift off of the touch or resting item can be detected when the current draw ceases.

The uniform conductive layer comprises, for example, an indium tin oxide (ITO) layer. This capacitive layer can detect a touch of an object such as a finger, and a drag of an object, as well as lift off of an object, as mentioned above. While capacitive touchscreens are widely used and have many advantages, a capacitive touchscreen, used by itself, is not ideal in locating the touches of multiple objects that occur at or near the same time. Layer 204 can also be used to transmit an RF field, and in one embodiment the composite touchscreen 200 may also be used to identify the source of a touch with radio frequency identification ("RFID") using the layer 204 as an RFID antenna. The bottom layer is depicted as a glass substrate (layer) 206. The glass substrate 206 can provide the structural strength for the composite touchscreen. Beneath the glass substrate is the underlying display (not shown) of the touchscreen.

A touch at each position on the glass generates a unique sound. The impact when the screen is touched, or the friction caused while dragging between a user's finger or stylus and the glass, creates an acoustic wave. The wave radiates away from the touch point, making its way to the transducers. The four transducers, 208A-D, attached to the edges of the touchscreen glass pick up the sound of the touch. In one embodiment, the sound is then digitized by the controller 310A/B or processor 156 and compared to a list of prerecorded sounds for every position on the glass. The cursor position is instantly updated to the touch location. The APR system is designed to ignore extraneous and ambient sounds, as they do not match a stored sound profile.

APR differs from other attempts to recognize the position of touch with transducers or microphones, as it uses a simple table lookup method rather than requiring powerful and expensive signal processing hardware to attempt to calculate the touch location without any references.

In an embodiment where the capacitive element 204 utilizes projected capacitive technology, a sensor grid of micro-fine wires, may be laminated between two protective layers. The protective layers may be the SiO2 layer 202 and glass substrate 206, or may alternatively be two additional protective layers (not shown).

The composite touchscreen 200 has many advantages over prior commercially available touchscreens.

Resistive touchscreens have been the most popular technology used in retail, restaurant, and other applications, in spite of having an outer plastic layer that degrades the optics and can wear out over time. This is because it allows a user to touch the display with a pen, credit card, or ID card or to be able to touch small boxes along the bottom edge of the display where only a fingernail or pen will make contact.

In addition to the optical qualities and resistance to wear of glass, as with surface wave, APR technology can be activated with a finger, fingernail, pen or stylus, or credit card, as with resistive technology.

For some applications such as gaming, a primary issue is not optics, durability, or stylus choice, but contaminant resistance. Here resistive and capacitive technologies have had the edge, as they continue to work with liquids and other contaminants on the screen, and they can be easily sealed.

APR technology is resistant to contaminants on the screen such as liquids, dirt, ketchup, grease, and ultrasound gels, and it even works with scratches. It can also be sealed watertight to industrial standards, has the optical qualities of glass and like glass is resistant to cleaning and sterilizing chemicals, and can be activated with fingers or other various items.

APR does not miss touches of short duration as some other technologies do, because a short tap also generates a recognizable sound. Most touch applications are simple "touch-and-go," designed for public users or employees with little training. Capacitive is normally the best technology for dragging, but APR recognizes a quick tap and handles dragging very well, like capacitive.

APR technology is also distinguished from other surface acoustic wave ("SAW") technology. A non-APR surface acoustic wave touchscreen comprises a glass overlay with transmitting and receiving piezoelectric transducers for the X and Y axes. The controller sends an electrical signal to the transmitting transducer, which converts the signal into ultrasonic waves within the surface of a glass layer. These waves are directed across the touchscreen by an array of reflectors. Reflectors on the opposite side gather and direct the waves to the receiving transducer, which reconverts them into an electrical signal. The process is repeated for each axis. A touch absorbs a portion of the waves traveling across it. The received signals for X and Y are compared to the stored digital maps, the change recognized, and a coordinate calculated.

Although, a preferred embodiment of composite touchscreen 200 utilizes APR technology with capacitive technology, in another embodiment the capacitive technology is used in conjunction with surface acoustic wave technology previously described rather than with APR technology. The APR touchscreen may in alternative embodiments of a composite touchscreen be combined with a resistive touchscreen.

Touch-and-hold or drag-and-hold are currently not possible with APR technology alone, as no sounds are emitted in the hold position. Additionally, the lift-off of a hold or object is also not reliably detectable with APR technology alone.

Figure 3:
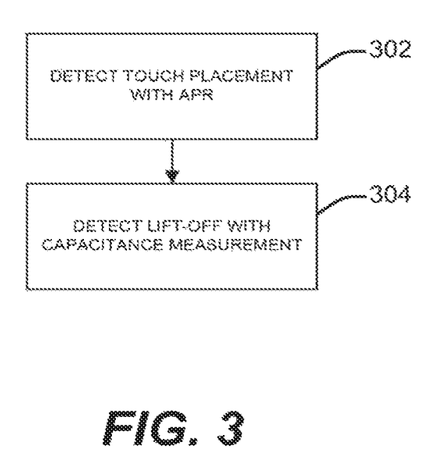
FIG. 3 is a flowchart illustrating a method of detection utilizing a composite touchscreen, according to an embodiment of the invention.

FIG. 3 illustrates an overview of sensing using composite touchscreen 200 and system 100. In step 302, a touch is detected with the APR functionality and elements of screen 200. Then in step 304, the lift off of an object is detected with a capacitance measurement using the capacitive functionality and elements of screen 200. A drag operation may be sensed by either the APR or capacitive functionality or a combination of the two.

Figure 4:
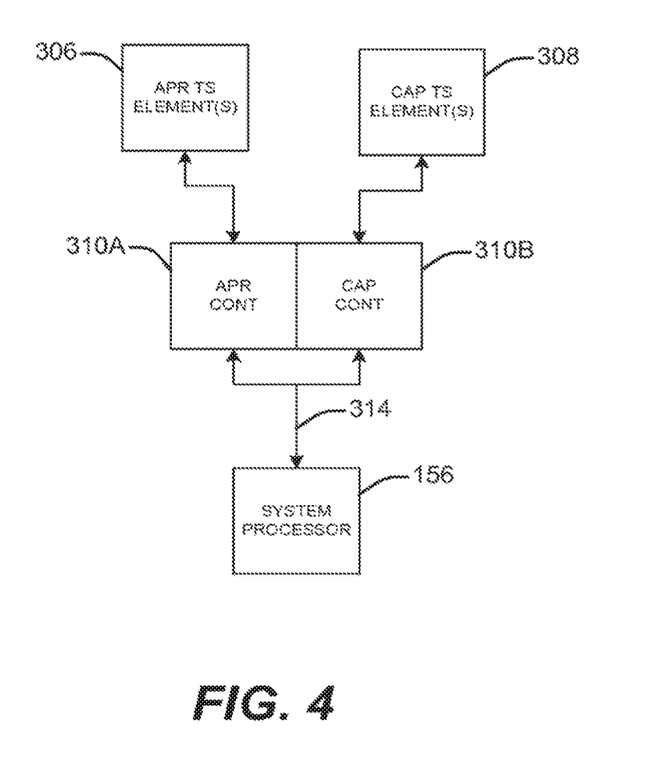
FIG. 4 is a block diagram illustrating touchscreen and processing componentry.

FIG. 4 illustrates a block diagram of some components of composite touchscreen 200 and system 100. APR touchscreen element(s) 306, which comprise at least the APR transducers 508A-D and may also be said to comprise the glass substrate 206 and protective SiO2 layer 20, are electrically coupled to APR touchscreen controller 310A. Capacitive touchscreen element(s) 308 are electrically coupled to capacitive touchscreen controller 310B. Capacitive touchscreen elements comprise the capacitive touchscreen layer 204 and the associated circuitry including the electrodes around the layer's edge. Controller 310A and 310B may be discrete devices or may be a single controller with both APR and capacitive touchscreen control functionality. The controllers comprise processing and control circuitry as well as memory for storing logic to operate the composite screen. Controllers 310A and 310B are coupled to a system level processor 156 via communications link(s) 314 which may comprise multiple discrete links or may alternatively comprise a serial connection with both data to/from APR controller 310A and capacitive controller 310B.

Figure 5:
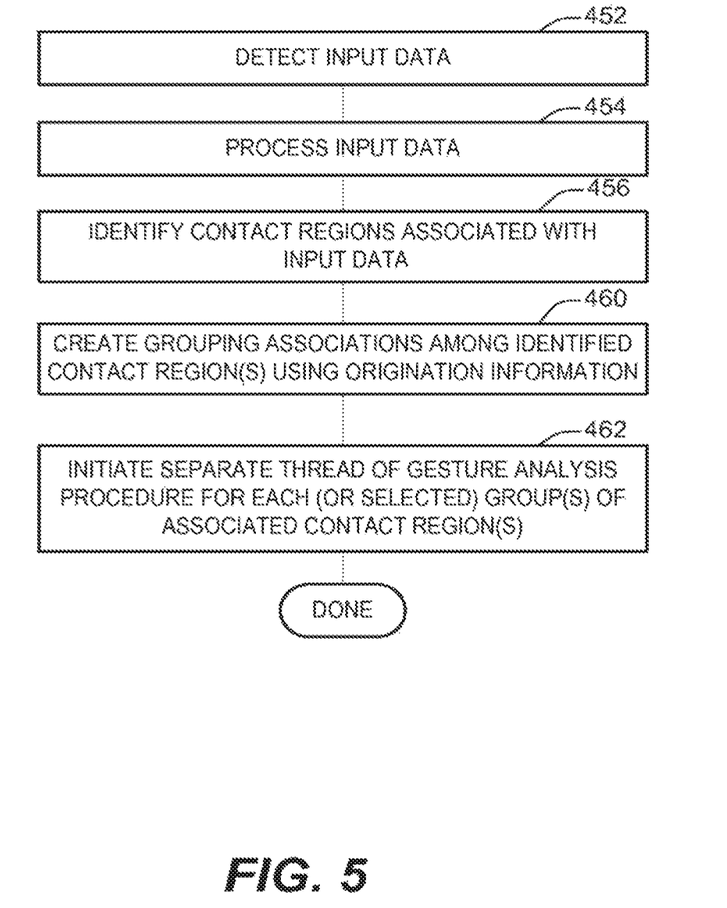
FIG. 5 is a flowchart illustrating input analysis, according to an embodiment of the invention.
Figure 6:
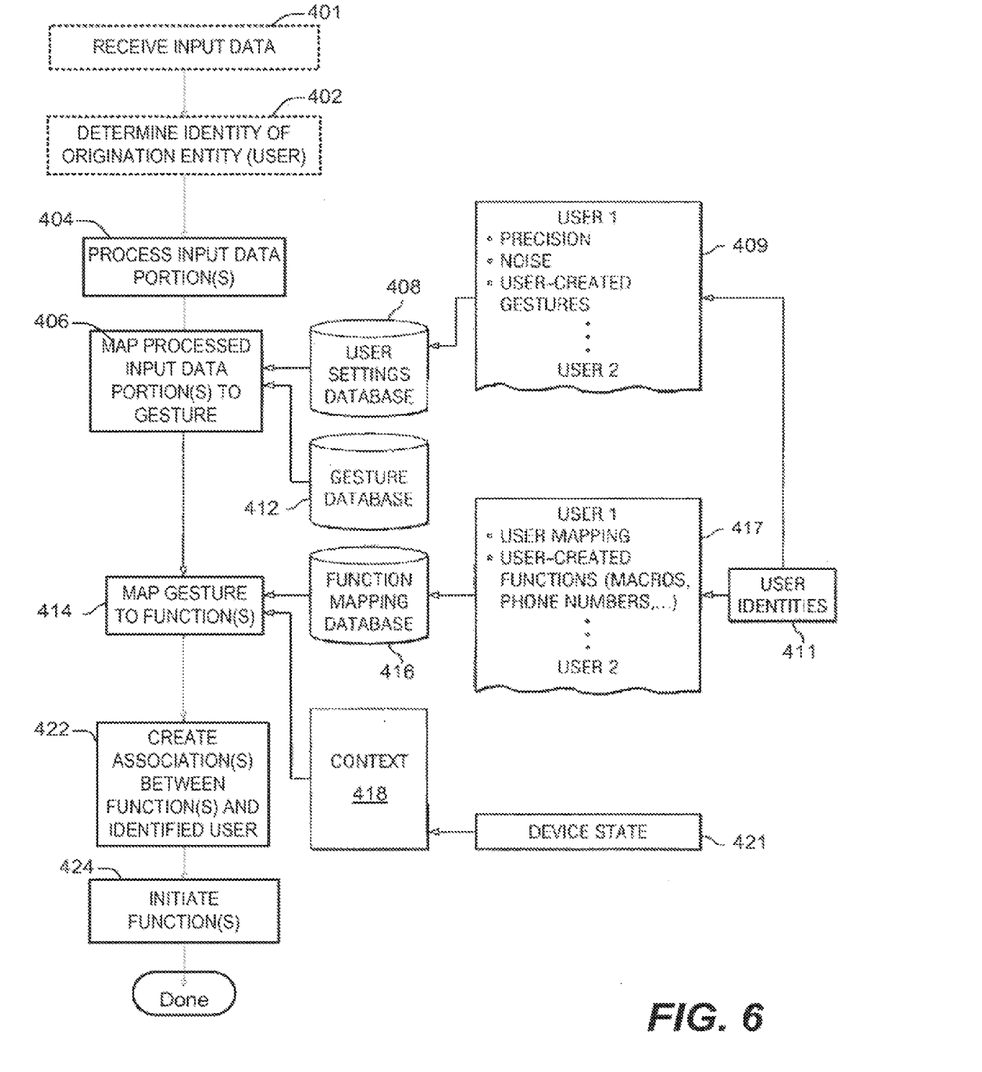
FIG. 6 is a flowchart illustrating gesture analysis, according to an embodiment of the invention.

FIG. 5 shows an example embodiment of input analysis and FIG. 6 shows an example embodiment of gesture analysis that may be implemented by one or more systems, devices, and/or components of an electronic gaming system.

Referring first to FIG. 5, as the various different players at a gaming system interact with the gaming system's display, the gaming system may detect (452) various types of input data. For example, according to different embodiments, the input data may be represented by one or more images (e.g., captured using one or more different types of sensors). For example, in a preferred embodiment a touch is detected by the APR system and the lift-off of an item (e.g. hand) is detected by the capacitive touchscreen components using a composite touchscreen.

At 454, the input data may be processed. In at least one embodiment, at least a portion of the input data may be processed by the gaming controller of the gaming system. In some embodiments, separate processors and/or processing systems may be provided at the gaming system for processing all or specific portions of the input data. For example, the input data may be processed by touchscreen controllers 310A and/or 310B, alone or in combination with processor 156.

In at least one embodiment, the processing of the input data may include identifying (456) the various contact region(s) and/or chords associated with the processed input data. Generally speaking, when objects are placed near or on a touch sensing surface, one or more regions of contact (sometimes referred to as "contact patches") may be created and these contact regions form a pattern that can be identified. The pattern can be made with any assortment of objects and/or portions of one or more hands such as finger, thumb, palm, knuckles, etc.

At 460, various associations may be created between or among the different identified contact regions to thereby enable the identified contact regions to be separated into different groupings in accordance with their respective associations. For example, in at least one embodiment, the origination information may be used to identify or create different groupings of contact regions based on contact region-origination entity associations. In this way, each of the resulting groups of contact region(s) which are identified/created may be associated with the same origination entity as the other contact regions in that group.

It is anticipated that, in at least some embodiments, a complex gesture may permit or require participation by two or more users. As mentioned earlier, a composite touchscreen facilitates the recognition of multiple contemporaneous or simultaneous touches. For example, in one embodiment, a complex gesture for manipulating an object displayed at an interactive display surface may involve the participation of two or more different users simultaneously or concurrently interacting with that displayed object (e.g., wherein each user's interaction is implemented via a gesture performed at or over a respective region of the display object). Accordingly, in at least some embodiments, the gaming system may be operable to process the input data resulting from a multi-user combination gesture, and to identify and/or create associations between different identified groupings of contact regions. For example, where two or more different users at the gaming system are simultaneously or concurrently interacting with a displayed object, the identified individual contact regions may be grouped together according to their common contact region-origination entity associations, and the identified groups of contact regions may be associated or grouped together based on their identified common associations (if any).

As shown at 462, one or more separate (and/or concurrent) threads of a gesture analysis procedure may be initiated for each (or selected) group(s) of associated contact region(s).

In the example of FIG. 6, it is assumed that a separate instance or thread of gesture analysis has been initiated (e.g., during input analysis) for processing a gesture involving an identified grouping of one or more contact region(s) which has been performed by a user.

As shown at 401, it is assumed that various types of input parameters/data may be provided to the gesture analysis procedure for processing. Examples of various types of input data which may be provided to the gesture analysis procedure may include, but are not limited to, one or more of the following (or combinations thereof):

- identified groupings of contact region(s);
- origination information (e.g., contact region-origination entity associations, touch-ownership associations, etc.);
- origination entity identifier information;
- information useful for determining an identity of the player/person performing the gesture;
- association(s) between different identified groups of contact regions;
- number/quantity of contact regions;
- shapes/sizes of regions;
- coordination location(s) of contact region(s) (which, for example, may be expressed as a function of time and/or location);
- arrangement of contact region(s)
- raw movement data (e.g., data relating to movements or locations of one or more identified contact region(s), which, for example, may be expressed as a function of time and/or location);
- movement characteristics of gesture (and/or portions thereof) such as, for example, velocity, displacement, acceleration, rotation, orientation, etc.;
- timestamp information (e.g., gesture start time, gesture end time, overall duration, duration of discrete portions of gesture, etc.)
- game state information;
- gaming system state information;
- starting point of gesture;
- ending point of gesture;
- number of discrete acts involved with gesture;
- types of discrete acts involved with gesture;
- order of sequence of the discrete acts;
- contact/non-contact based gesture;
- initial point of contact of gesture;
- ending point of contact of gesture;
- current state of game play (e.g., which existed at the time when gesture detected);
- game type of game being played at gaming system (e.g., as of the time when the gesture was detected);
- game theme of game being played at gaming system (e.g., as of the time when the gesture was detected);
- current activity being performed by user (e.g., as of the time when the gesture was detected);

For further information on gesture recognition, please refer to U.S. patent application Ser. No. 12/265,627 entitled "Intelligent Multiplayer Gaming System With Multi-Touch Display" to Wells et al., which is hereby incorporated by this reference in the entirety. In at least some embodiments, at least some of the example input data described above may be determined during processing of the input data at 404.

At 402, an identity of the origination entity (e.g., identity of the user who performed the gesture) may optionally be determined. In at least one embodiment, such information may be subsequently used for performing user-specific gesture interpretation/analysis, for example, based on known characteristics relating to that specific user. In some embodiments, the determination of the user/originator identity may be performed at a subsequent stage.

At 404, the received input data portions(s) may be processed, along with other contemporaneous information, to determine, for example, various properties and/or characteristics associated with the input data such as, for example, one or more of the following (or combinations thereof):

- Determining and/or recognizing various contact region characteristics such as, for example, one or more of the following (or combinations thereof): number/quantity of contact regions; shapes/sizes of regions; coordination location(s) of contact region(s) (which, for example, may be expressed as a function of time and/or location); arrangement(s) of contact region(s);
- Determining and/or recognizing association(s) between different identified groups of contact regions;
- Determining and/or recognizing raw movement data such as, for example: data relating to movements or locations of one or more identified contact region(s), which, for example, may be expressed as a function of time and/or location;
- Determining information useful for determining an identity of the player/person performing the gesture;
- Determining and/or recognizing movement characteristics of the gesture (and/or portions thereof) such as, for example: velocity, displacement, acceleration, rotation, orientation, etc.;
- Determining and/or recognizing various types of gesture specific characteristics such as, for example, one or more of the following (or combinations thereof): starting point of gesture; ending point of gesture; starting time of gesture; ending time of gesture; duration of gesture (and/or portions thereof); number of discrete acts involved with gesture; types of discrete acts involved with gesture; order of sequence of the discrete acts; contact/non-contact based gesture; initial point of contact of gesture; ending point of contact of gesture; etc.
- Determining and/or accessing other types of information which may be contextually relevant for gesture interpretation and/or gesture-function mapping, such as, for example, one or more of the following (or combinations thereof): game state information; gaming system state information; current state of game play (e.g., which existed at the time when gesture detected); game type of game being played at gaming system (e.g., as of the time when the gesture was detected); game theme of game being played at gaming system (e.g., as of the time when the gesture was detected); number of persons present at the gaming system; number of persons concurrently interacting with the interacting with the multi-touch, multi-player interactive display surface (e.g., as of the time when the gesture was detected); current activity being performed by user (e.g., as of the time when the gesture was detected); number of active players participating in current game; amount or value of user's wagering assets;

In at least one embodiment, the processing of the input data at 404 may also include application of various filtering techniques and/or fusion of data from multiple detection or sensing components of the gaming system.

At 408, the processed raw movement data portion(s) may be mapped to a gesture. According to specific embodiments, the mapping of movement data to a gesture may include, for example, accessing (408) a user settings database, which, for example, may include user data (e.g., 409). According to specific embodiments, such user data may include, for example, one or more of the following (or combination thereof): user precision and/or noise characteristics/thresholds; user-created gestures; user identity data and/or other user-specific data or information. According to specific embodiments, the user data 409 may be used to facilitate customization of various types of gestures according to different, customized user profiles.

Additionally, in at least some embodiments, mapping of the actual motion to a gesture may also include accessing a gesture database (e.g., 412). For example, in one embodiment, the gesture database 412 may include data which characterizes a plurality of different gestures recognizable by the electronic gaming system for mapping the raw movement data to a specific gesture (or specific gesture profile) of the gesture database. In at least one embodiment, at least some of the gestures of the gesture database may each be defined by a series, sequence and/or pattern of discrete acts. In one embodiment, the raw movement data may be matched to a pattern of discrete acts corresponding to of one of the gestures of the gesture database.

It will be appreciated that, it may be difficult for a user to precisely duplicate the same raw movements for one or more gestures each time those gestures are to be used as input. Accordingly, particular embodiments may be operable to allow for varying levels of precision in gesture input. Precision describes how accurately a gesture must be executed in order to constitute a match to a gesture recognized by the electronic gaming system, such as a gesture included in a gesture database accessed by the electronic gaming system. According to specific embodiments, the closer a user generated motion must match a gesture in a gesture database, the harder it will be to successfully execute such gesture motion. In particular embodiments movements may be matched to gestures of a gesture database by matching (or approximately matching) a detected series, sequence and/or pattern of raw movements to those of the gestures of the gesture database.

For example, as the precision of gestures required for recognition increases, one may have more gestures (at the same level of complexity) that may be distinctly recognized. In particular embodiments, the precision required by electronic gaming system for gesture input may be varied. Different levels of precision may be required based upon different conditions, events and/or other criteria such as, for example, different users, different regions of the "gesture space" (e.g., similar gestures may need more precise execution for recognition while gestures that are very unique may not need as much precision in execution), different individual gestures, such as signatures, and different functions mapped to certain gestures (e.g., more critical functions may require greater precision for their respective gesture inputs to be recognized), etc. In some embodiments users and/or casino operators may be able to set the level(s) of precision required for some or all gestures or gestures of one or more gesture spaces.

According to specific embodiments, gestures may be recognized by detecting a series, sequence and/or pattern of raw movements performed by a user according to an intended gesture. In at least one embodiment, recognition may occur when the series, sequence and/or pattern of raw movements is/are matched by the electronic gaming system (and/or other system or device) to a gesture of a gesture database.

At 414, the gesture may be mapped to one or more operations, input instructions, and/or tasks (herein collectively referred to as "functions"). According to at least one embodiment, this may include accessing a function mapping database (e.g., 416) which, for example, may include correlation information between gestures and functions.

In at least one embodiment, different types of external variables (e.g., context information 418) may affect the mappings of gestures to the appropriate functions. Thus, for example, in at least one embodiment, function mapping database 416 may include specific mapping instructions, characteristics, functions and/or any other input information which may be applicable for mapping a particular gesture to appropriate mapable features (e.g., functions, operations, input instructions, tasks, keystrokes, etc) using at least a portion of the external variable or context information associated with the gesture. Additionally, in at least some embodiments, different users may have different mappings of gestures to functions and different user-created functions.

For example, according to specific embodiments, various types of context information (and/or criteria) may be used in determining the mapping of a particular gesture to one or more mapable features or functions. Examples of such context information may include, but are not limited to, one or more of the following (or combinations thereof):

- game state information (e.g., current state of game play at the time when gesture performed);
- criteria relating to game play rules/regulations (e.g., relating to the game currently being played by the user);
- criteria relating to wagering rules/regulations;
- game type information (e.g., of game being played at electronic gaming system at the time when gesture performed);
- game theme information (e.g., of game being played at electronic gaming system at the time when gesture performed);
- wager-related paytable information (e.g., relating to the game currently being played by the user);
- wager-related denomination information (e.g., relating to the game currently being played by the user);
- user identity information (e.g., 411), which, for example, may include information relating to an identity of the player/person performing the gesture;
- time/date information;
- location(s) of the region(s) of contact at (or over) the multi-touch, multi-player interactive display surface of the gesture;
- content displayed at the multi-touch, multi-player interactive display (e.g., at the time when gesture performed);
- user/player preferences;
- device state information (e.g., 421);
- etc.

Thus, for example, in at least one embodiment, a first identified gesture may be mapped to a first set of functions (which, for example, may include one or more specific features or functions) if the gesture was performed during play of a first game type (e.g., Blackjack) at the electronic gaming system; whereas the first identified gesture may be mapped to a second set of functions if the gesture was performed during play of a second game type (e.g., Sic Bo) at the electronic gaming system.

At 422 one or more associations may be created between the identified function(s) and the user who has been identified as the originator of the identified gesture. In at least one embodiment, such associations may be used, for example, for creating a causal association between the initiation of one or more functions at the gaming system and the input instructions provided by the user (via interpretation of the user's gesture).

As shown at 424, the electronic gaming system may initiate the appropriate mapable set of features or functions which have been mapped to the identified gesture. For example, in at least one embodiment, an identified gesture may be mapped to a specific set of functions which are associated with a particular player input instruction (e.g., "STAND") to be processed and executed during play of a blackjack gaming session conducted at the electronic gaming system.

Figure 7:
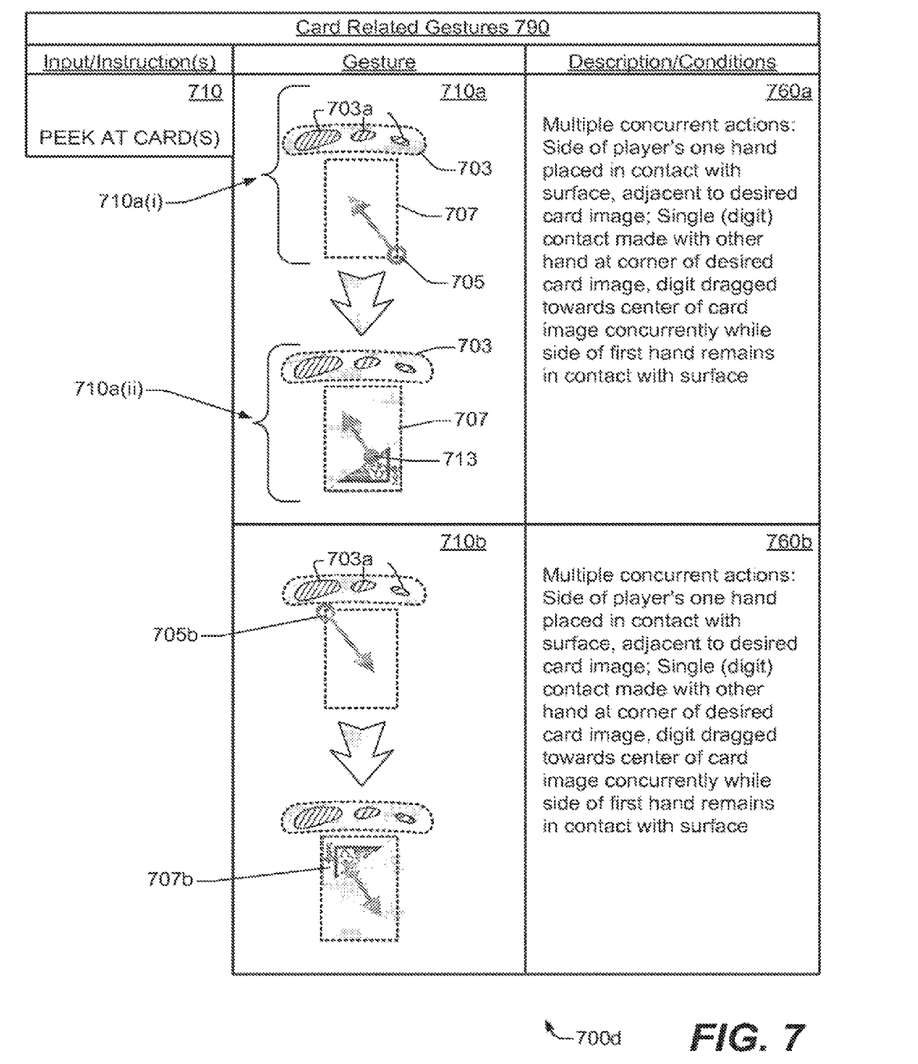
FIG. 7 illustrates an exemplary gesture that may be detected with the composite touchscreen 200 and/or gaming system 100.

FIG. 7 illustrates an example of card game related gesture-function mapping information in order to illustrate gesture recognition using a composite touchscreen display As illustrated in the example embodiment of FIG. 7, an example gesture graphically represented (e.g., at 710*a*) and described which, for example, may be mapped to function(s) (e.g., user input/instructions) corresponding to: PEEK AT CARD(S). For example, in at least one embodiment, a user may convey the input/instruction(s) PEEK AT CARD(S) for example, by concurrently performing multiple different movements and/or gestures (e.g., as illustrated at 710*a*) at a touchscreen interface of the gaming system. As illustrated in the example embodiment of FIG. 7, combination gesture 710*a* may be defined to include at least the following gesture-specific characteristics: multiple concurrent gestures: side of one hand (e.g., 703) placed in contact with surface adjacent to desired card(s) image (e.g., 707); single region of contact (e.g., 705) on or above corner of card(s), continuous drag towards center of card(s) image concurrently while side of one hand remains in contact with surface. In at least one embodiment, a user may be required to use both hands to perform this combination gesture. The placement of the side of one hand may be sensed with the APR system whereas lift-off of the hand would then be sensed by capacitive measurement with capacitive touchscreen element. Placement, prolonged placement, or resting of the object is something that is longer than a touch. When the lift-off of the hand (703) is sensed, in certain games such as Texas hold-em, the players cards would automatically be hidden, so that when the shielding provided by the hand is removed, players cannot see the cards of others. In one embodiment this occurs without any further actions or gestures required by the user.

As illustrated in the example embodiment of FIG. 7, as the user performs this gesture and continues to slide or drag his finger over the card(s) image (e.g., as represented at 713), the image of the card(s) 707 may automatically and dynamically be updated to reveal a portion (e.g., 707*a*) of one or more of the card face(s) to the user. In at least one embodiment, use of the covering hand (e.g., 703) may be required to help obscure visibility of the displayed portion (707*a*) of card face(s) by other players at the gaming table. Different logical regions may be established within areas of the display that are monitored for certain actions. For example, a first logical region may be established at or near the area of the image of the card(s) 707 whereas another logical region may be established at or near where the hand 703 is expected.

As mentioned above, in at least one embodiment, the image of the card(s) 707 may automatically and dynamically be updated to remove the displayed portion (707*a*) of the card face(s), for example, in response to detecting a non-compliant condition of the gesture, such as, for example, the removal of the covering hand 703 and/or sliding digit.

As illustrated in the example embodiment of FIG. 7, the electronic gaming system may be configured or designed to recognize and/or identify one or more different patterns and/or arrangements of concurrent contact regions (e.g., 703*a*) as being representative of (and/or as corresponding to) a side of a human hand (e.g., in one or more configurations) being placed in contact with the multi-touch input interface.

Gesture 710*b* represents an alternative example gesture combination which, for example, may be mapped to function(s) (e.g., user input/instructions) corresponding to: PEEK AT CARD(S). In at least one embodiment, this combination gesture may be performed in a manner similar to that of gesture 710*a*, except that, as shown at 710*b*, the user may initiate the gesture at a different corner (e.g., 705*b*) of the card(s) to cause a different portion or region (e.g., 707*b*) of the card(s) to be revealed.

While the invention has been particularly shown and described with reference to specific embodiments thereof, it will be understood by those skilled in the art that changes in the form and details of the disclosed embodiments may be made without departing from the spirit or scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

The invention is claimed as follows:

1. A gaming system comprising:
a memory device;
a microprocessor; and
a composite touchscreen including:
  a display,
  an acoustic pulse recognition touchscreen subsystem,
  a capacitive touchscreen subsystem,
  one or more touchscreen controllers, and
  wherein the touchscreen is configured to detect an x-y coordinate location of a touch of the touchscreen with the acoustic pulse recognition subsystem and to detect a simultaneous lift-off of an object from the touchscreen with the capacitive touchscreen subsystem.

2. The gaming system of claim 1, which is configured to access a database of touchscreen input data stored in the memory device, and to map a plurality of detected inputs at the touchscreen to one or more gestures.

3. The gaming system of claim 1, wherein the simultaneous touch of the touchscreen and the lift-off of the object are of associated with a same image displayed by the touchscreen.

4. The gaming system of claim 1, wherein the acoustic pulse recognition subsystem is configured to generate a unique sound based upon the x-y coordinate location of the touch on the touchscreen.

5. The gaming system of claim 1, wherein the simultaneous touch of the touchscreen and the lift-off of the object are made by different users.

6. A gaming device comprising:
a microprocessor;
a memory device; and
a touchscreen including:
a transparent substrate,
a plurality of acoustic pulse sensors disposed upon a first surface of the transparent substrate and configured to detect an acoustic wave generated by an object making contact with the substrate or a layer in contact with the substrate,
a capacitive plate including a transparent conductive layer disposed upon a second surface of the transparent substrate,
an insulating layer disposed upon a surface of the capacitive plate, and
control circuitry configured to detect an x-y coordinate location of a touch by measuring an output of the plurality of acoustic pulse sensors, and to detect a simultaneous lift-off of an object in contact with the capacitive plate or a layer disposed upon the plate.

7. The gaming device of claim 6, which includes a gesture and function database stored within the memory device.

8. The gaming device of claim 7, wherein the microprocessor is configured to:
receive an output from the touchscreen;
access the gesture and function database; and
map the output of the touchscreen to a gesture.

9. The gaming device of claim 6, wherein the simultaneous touch of the touchscreen and the lift-off of the object are of associated with a same image displayed by the touchscreen.

10. The gaming device of claim 6, wherein the simultaneous touch of the touchscreen and the lift-off of the object are made by different users.

11. An electronic gaming machine comprising:
a memory device;
a microprocessor; and
a composite touchscreen display including:
a display,
an acoustic pulse recognition touchscreen subsystem,
a capacitive touchscreen subsystem, and
one or more touchscreen controllers,
wherein the touchscreen is configured to:
detect a touch within a first logical region of the composite touchscreen display with the acoustic pulse recognition portion of the composite touchscreen display,
detect a simultaneous lift off of an object within a second logical region of the composite touchscreen display with a capacitive portion of the composite touchscreen display, and
change at least one displayed image within the first logical region when the lift off is detected in the second logical region.

12. The electronic gaming machine of claim 11, wherein the simultaneous touch of the composite touchscreen display and the lift-off of the object are of associated with a same image displayed by the composite touchscreen display.

13. The electronic gaming machine of claim 11, wherein the simultaneous touch of the composite touchscreen display and the lift-off of the object are made by different users.

14. An electronic gaming machine comprising:
a memory device;
a microprocessor; and
a composite touchscreen display including:
a display,
an acoustic pulse recognition touchscreen subsystem,
a capacitive touchscreen subsystem, and
one or more touchscreen controllers,
wherein the composite touchscreen is configured to
detect a touch within a first logical region of the composite touchscreen display with the acoustic pulse recognition portion of the composite touchscreen display,
detect a simultaneous lift off of an object within a second logical region of the composite touchscreen display with a capacitive portion of the composite touchscreen display, and
change at least one displayed image within the second logical region when the lift off is detected in the second logical region.

15. The electronic gaming machine of claim 14, wherein the simultaneous touch of the composite touchscreen display and the lift-off of the object are of associated with a same image displayed by the composite touchscreen display.

16. The electronic gaming machine of claim 14, wherein the simultaneous touch of the composite touchscreen display and the lift-off of the object are made by different users.

17. A method of operating a gaming machine, said method comprising:
establishing a first logical region of a touchscreen display;
establishing a second logical region of the touchscreen display;
detecting a touch within the first logical region with an acoustic pulse recognition portion of the touchscreen display;
detecting a simultaneous lift off of an object within the second logical region with a capacitive portion of the touchscreen display; and
changing at least one displayed image within the first logical region when the lift off is detected in the second logical region.

18. The method of claim 17, wherein the simultaneous touch of the touchscreen display and the lift-off of the object are of associated with a same image displayed by the touchscreen display.

19. The method of claim 17, wherein the simultaneous touch of the touchscreen display and the lift-off of the object are made by different users.

20. A method of operating a gaming machine, said method comprising:
establishing a first logical region of a touchscreen display;
establishing a second logical region of the touchscreen display;
detecting a touch within the first logical region with an acoustic pulse recognition portion of the touchscreen display;
detecting a simultaneous lift off of an object within the second logical region with a capacitive portion of the touchscreen display; and
changing at least one displayed image within the second logical region when the lift off is detected in the second logical region.

21. The method of claim 20, wherein the simultaneous touch of the touchscreen display and the lift-off of the object are of associated with a same image displayed by the touchscreen display.

22. The method of claim 20, wherein the simultaneous touch of the touchscreen display and the lift-off of the object are made by different users.

* * * * *